(12) United States Patent
Bechtold et al.

(10) Patent No.: US 7,762,145 B2
(45) Date of Patent: Jul. 27, 2010

(54) METHOD FOR MEASURING BENDING MOMENTS ON A JOINT AND MEASUREMENT ARRANGEMENT FOR PERFORMING THE METHOD

(75) Inventors: Nikolaj Bechtold, Erlangen (DE); Christian Schaufler, Herzogenaurach (DE); Horst Strobel, Herzogenaurach (DE); Holger Tetting, Nuremberg (DE); Lothar Gebhardt, Hagenbuchach (DE)

(73) Assignee: Schaeffler KG, Herzogenaurach (DE)

( * ) Notice: Subject to any disclaimer, the term of this patent is extended or adjusted under 35 U.S.C. 154(b) by 125 days.

(21) Appl. No.: 12/104,630

(22) Filed: Apr. 17, 2008

(65) Prior Publication Data
US 2008/0276721 A1 Nov. 13, 2008

Related U.S. Application Data

(60) Provisional application No. 60/916,855, filed on May 9, 2007.

(51) Int. Cl.
*G01N 3/20* (2006.01)

(52) U.S. Cl. .......................................... 73/849; 73/760
(58) Field of Classification Search .................. 73/760, 73/749, 849
See application file for complete search history.

(56) References Cited

U.S. PATENT DOCUMENTS

| | | | |
|---|---|---|---|
| 3,937,076 A * | 2/1976 | Pommellet et al. ............. 73/146 |
| 6,129,319 A * | 10/2000 | Metelski ................... 248/123.2 |
| 2008/0276728 A1* | 11/2008 | Bechtold et al. ....... 73/862.621 |

FOREIGN PATENT DOCUMENTS

| | | |
|---|---|---|
| DE | 3922194 | 11/1990 |
| DE | 4102278 | 7/1992 |

* cited by examiner

*Primary Examiner*—Max Noori
(74) *Attorney, Agent, or Firm*—Volpe and Koenig, P.C.

(57) ABSTRACT

The invention relates to a method for measuring bending moments on a joint (12) wherein the joint (12) is formed at least from two joint sections (11, 13), which are flexible relative to each other at least about a bending axis (14, 15).

17 Claims, 9 Drawing Sheets

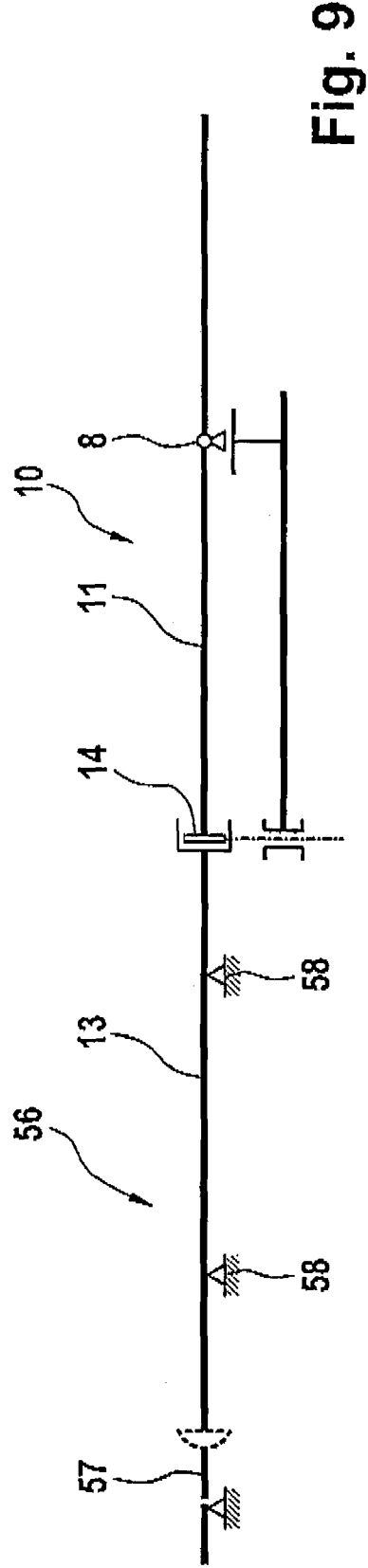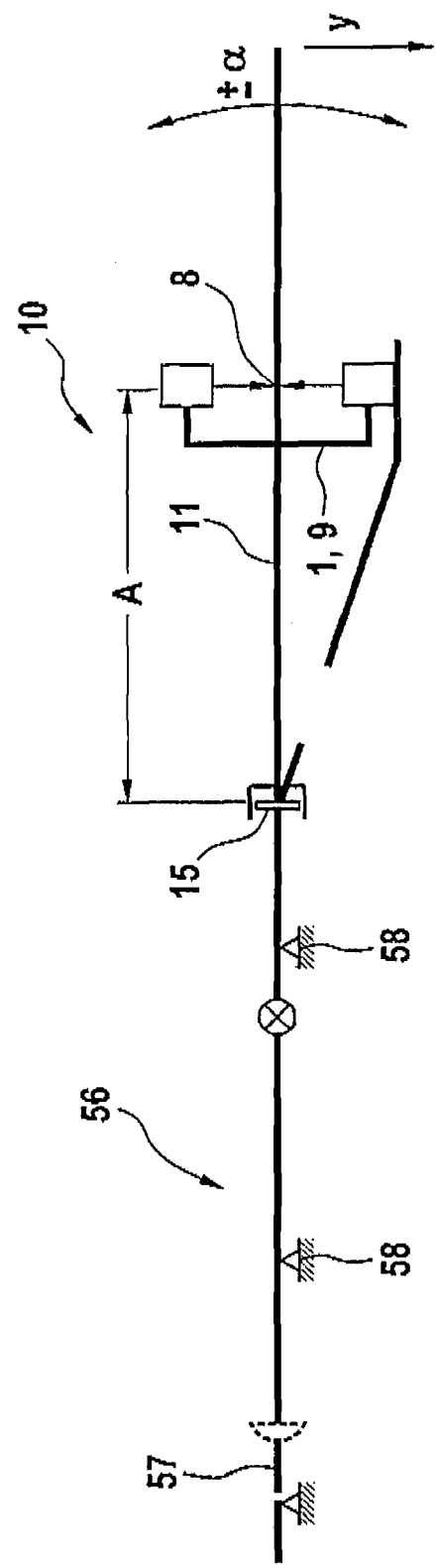

METHOD FOR MEASURING BENDING MOMENTS ON A JOINT AND MEASUREMENT ARRANGEMENT FOR PERFORMING THE METHOD

CROSS-REFERENCE TO RELATED APPLICATIONS

This application claims the benefit of U.S. Provisional Application. No. 60/916,855, filed May 9, 2007, which is incorporated by reference herein as if fully set forth.

BACKGROUND

The invention relates to a method for measuring bending moments on a joint, wherein the joint is formed at least from two joint sections, which are flexible relative to each other about at least a bending axis, in which the joint is bent, in that a first joint section is pivoted about a pivot axis relative to a rigidly clamped second joint section.

The invention relates to the class of measurement arrangements for measuring reaction moments and forces of bending moments on individual joints. In this case, the levers are used for simplifying the holding and measuring as an extension of a joint section. Alternatively, the levers are articulated shaft sections of articulated shafts, for example, articulated shafts from drive trains of motor vehicles, when the bending moments of complete articulated shaft arrangements are measured. The articulated shaft sections are connected in an articulated manner to another articulated shaft section via a joint.

The reaction forces or reaction moments develop in the device as reactions to torques in rotating connections or in bearings or as reactions to bending moments in joints, when rotating connections or bearings are turned or joints are bent. In articulated shafts of the drive train of vehicles, the bending moment is a measure for the prevailing play in the joint arrangement. However, for example, in so-called constant-velocity joints, especially in pin universal joints, the play is an evaluation criterium for the function of the articulated shaft arrangement. Unbalanced masses around the rotational axes of the articulated shaft sections can develop due to play that is too great.

The resistance at the folding point of a joint is designated as the bending moment, which is directed opposite the bending of two articulated shaft sections connected to the joint and can be detected and thus can be measured. The bending moment is dependent on the construction of the hinged connection and is comprised, for example, from friction moments and from other resistances of the roller contact at a joint of an articulated shaft of a motor vehicle. In such joints, the value of the bending moment is set at the freedom of play of the joint. The joints are installed intentionally with pre-tensioning. Friction is intentionally set, for example, between the ends of the pin joint and the bases of the universal joint bushings. With the measurement of the bending moment, this resistance can be tested together with other resistances, for example, together with the resistances from the radial roller bearings of the universal joint bushings. For this purpose, a joint section of the articulated shaft arrangement is fixed and the other pivots about one of the axes of the pin joint by up to 90° or by a different angle of arbitrary size.

With constant-velocity joints, a hinged connection, which transmits torques and which must allow relative axial movements between the articulated shaft sections, is produced between two articulated shaft sections. For this purpose, the joints usually feature roller bodies, which are guided in raceways and on which the two joint sections roll relative to each other so that they can move in the axial direction and by means of which the joint sections are engaged with each other to transmit torque with a positive fit in the peripheral direction. The friction moments should be as small as possible in this arrangement.

Pin universal joints are hinged connections transmitting torques between two articulated shaft sections without play as much as possible in all directions. In pin universal joints, each of the articulated shaft sections is provided with a joint yoke. The two joint yokes are connected via a universal joint so that they can pivot about two joint axes and are supported usually with low friction as much as possible on the pin of the universal joint by means of roller bearings. Each of the joint axes corresponds to one of the pin joint axes, which are oriented perpendicular to each other and which cross at the center of the universal joint.

Small play in joint arrangements is important for the function of the articulated shaft. Because the constant-velocity joints should allow axial compensation, the play is positive. Positive plays are air gaps between elements supported one on the other. These plays should be as small as possible, but should also be provided to keep the bending moments small. In contrast, in pin universal joint arrangements, the pin joint and the joint yokes are mounted, as mentioned above, so that they can move relative to each other, without play, and with pre-tensioning. In order to guarantee freedom of play, the elements are preferably mounted relative to each other with negative play, that is, with pre-tensioning. A measure for the freedom of play or the measure for the pre-tensioning, with which the joint yokes and the pin joint are to be mounted or are assembled with each other is the bending moment, with which the pre-tensioned joint can bend about the respective joint axis.

DE 39 22 194 C1 describes a method and a device of the most general form for measuring bending moments in pin universal joint arrangements. The device is formed by a holder, with which an articulated shaft section is held stationary. The joint yoke of this joint section is oriented in the device so that the other articulated shaft section is driven by the pivot drive so that it can pivot about the joint axes of the pin joint. A bending rod, whose fibers of the outer skin are elongated or compressed as a function of bending direction and resistance of the joint, is arranged between the pivoting joint section and the pivot drive. Expansion measurement strips, with which the expansion of the fibers is detected and converted into corresponding electrical voltage magnitudes, are arranged on the outer skin. The pivot drive is connected in an articulated way to a radial guide and then via a ball-and-socket joint to the bending rod. The radial guidance can pivot with a pivoting angle of 90° about the rotational axis of the articulated shaft arrangement in the sense of rotation by means of the pivot drive.

With the method described in DE 39 22 194 C1, in the device counter-acting bending moments about the two joint axes when the moving joint section bends relative to the rigid joint section are measured. For this purpose, a radial guidance is pivoted about the rotational axis on an arc by 90° in the sense of rotation by means of the pivot drive. Here, the counteracting bending moments on the joint axes are first detected in the form of tension magnitudes on the expansion measurement strips of the bending rod. These tension magnitudes are proportional to the bending moments, are recorded, and are selectively converted and displayed legibly in a display device.

DE 41 02 278 A1 shows and describes a device for measuring forces and moments in articulated shaft arrangements with constant-velocity joints. This device has a stationary receptacle, in which one of the joint sections is held rigidly. The other articulated shaft section can pivot relative to the fixed articulated shaft section by the joint. A so-called force-measuring device for force-path measurement, in which the pivoting articulated shaft section is held, is arranged on the pivot axis between the contact of the pivot drive and the joint. The bending moments are detected at force measurement sensors as deflections (path due to force), which are caused in the device by reaction forces to the moments on the bearing.

A portion of the weight of the first articulated shaft section is supported in the receptacle. Another portion of the weight of the first articulated shaft section is supported in the joint. Articulated shaft sections are heavy, so that the portions of weight to be supported are relatively high. Depending on the center of gravity of the first articulated shaft section, on the distance of the bending axis to the contact in the receptacle, and on the lever of the center of gravity to the bending axis, additional forces and moments are generated in the joint. The influence of this portion of the weight to the bending moments in the joint can therefore be relatively high and higher than the actual original bending moments appearing in the bearing. The measurement results can be falsified. Therefore, every new articulated shaft installed into the device must be calibrated in a complicated process before the beginning of the measurements of bending moments. Due to this calibration, however, the influence of the weight on the bending moment cannot be excluded, because the magnitude of the influence is scarcely to be determined and alternates from measurement arrangement to measurement arrangement. Consequently, the measurement results are faulty.

In the arrangement from DE 41 02 278 A1, an articulated shaft section is held in a receptacle, which is supported in the force measurement device so that it can move radially and axially by means of elastic means on carriers. Carriers are fixed in place, for example, on a base plate of the measurement device. The elastic elements should counteract the axial and radial movements and as much as possible have no restoring forces. Force measurement sensors are arranged between the suspended receptacle moving radially and axially and the non-moving carriers.

With force measurement sensors, usually the forces acting on the sensor are not measured directly. These sensors react to the displacement of objects from a starting position with displacements of sensor elements or through their deformation. The displacements and deformation result from forces or from moments. The reactions in the device are first displacements against defined resistances and then the displacement or deformation of sensor elements. In one evaluation device, the conversion of signals due to deformation into force measurement values is finally performed.

With force sensors, usually compression, shear, and tension forces are all measured. Most force sensors work with at least one spring-elastic body, whose elastic deformation is measured, or they react in a different way, for example, to changes in position using moving elements. Examples for such sensors are tension or compression rods or bending beams or membrane force sensors with expanding measurement strips.

Alternative force measurement sensors are, for example, piezoelectric force sensors that react to pressure. In a piezoceramic element, a voltage that is proportional to the force is generated due to the force. This voltage can be measured. The use of any suitable force sensor, for example, force sensors with electro-magnetic compensation or other force sensors with distance sensors and current regulation, is also conceivable.

In DE 41 02 278 A1, a measurement device is described, in which the receptacle is supported on elastic elements on a moving carrier. The elastic elements are elastically flexible like a hinge only in the pivoting directions, in which the articulated shaft section is pivoted for measuring bending moments. The bending moments are detected at sensors as deflections of the receptacle from an origin or position. The deflections are caused by reaction forces to the moments on the bearing. Sensors, which receive the deflection of the articulated shaft section, are each arranged between fixed carriers and the moving articulated shaft section. Dimensional and position deviations, for example, alignment errors between the rotational axes of the lever and the longitudinal axis of the receptacle in the device, can have the result that the receptacle assumes a position, which does not correspond to the rest position of receptacle before the measurements, because the receptacle is mounted in a spring-elastic way and avoids constraining movements due to the deviations. Because the sensors of the class-forming state of the art are in constant contact with the receptacle, these undesired displacements are already detected in the rest position as restoring moments or forces and falsify the actual measurement values. Therefore, their influence must be removed through calibration before the beginning of each new measurement.

As described in DE 41 02 278 A1, the measurement values are influenced by a coupling equalizing axial movements and by restoring moments of the elastic elements. Furthermore, the accuracy of the measurement results is dependent on the type and construction and engagement of the pivoting drive. The pivoting drive must be sensitive and steady, in order to avoid negative effects on the measurement results.

SUMMARY OF THE INVENTION

The invention is directed to a method for measuring bending moments on joints of articulated shafts, wherein bending moments can be measured very precisely while excluding all undesired external effects as much as possible. Furthermore, the invention provides a measurement device, with which this method can be implemented.

With the method of the invention, the bending moments on all types of joints and articulated shafts can be measured, which have at least two joint sections or articulated shaft sections connected in an articulated way by means of a joint. Here, either bending moments are applied to both joint sections/articulated shaft sections or preferably one of the joint sections/articulated shaft sections is bent and the other is clamped rigidly. The method is preferably divided into at least three process sections, which are constructed, for example, as described below, but can also be performed in a modified sequence in terms of the steps:

First Process Section: Preparations for the Measurement

The articulated shaft section/articulated shaft preferably clamped rigidly at a later time for the measurement is placed in the measurement device, preferably in two displaceable prism receptacles or also in a force measurement block.

The center of the joint is then oriented in a next step initially roughly relative to a centering peg. In articulated shaft arrangements with universal joints, the joint is oriented so that initially a bending axis is oriented in the same direction as the center axis of the centering peg. At a later time, the joint is then turned about the other bending axis by 90°, so that the other bending axis is oriented in the same direction as the center axis of the centering peg and this is repeated.

The articulated shaft section that can pivot at a later time for measurements is named first articulated shaft section or first joint section for purposes of distinguishing it.

In a next step the first articulated shaft section is placed/latched into a receptacle of the actual device pre-tensioned preferably without play and described below in more detail for measuring the reactions from the bending moments. The first articulated shaft section is clamped in this receptacle preferably without play in the radial directions, but can be shifted along its longitudinal axis/rotational axis.

The first articulated shaft section is initially oriented coarsely along its longitudinal axis, so that the center of gravity of the first articulated shaft section is supported in the device at a distance to the pivot axis, which is equal to the distance, with which the forces of the pivoting drive are also later introduced into the device.

Then the centering peg is extended and inserted, for example, into an eye of the joint yoke or in another centering opening, whose central axis is the bending axis, so that the pivoting axis of the measurement arrangement and the bending axis of the joint are concentric to each other after the centering.

The second articulated shaft section is clamped rigidly.

The centering peg is moved out from the eye and reinserted.

The distance, with which the center of gravity is at a distance to the pivoting axis, is input as a parameter into the evaluation software.

Parameters are set alternately or in common:

Limiting values (permissible pivoting speed or, for example, the bending moment)

Permissible tolerances of the bending moments and pivoting angle for both directions separately Number of run-in bends Measurement angle (pivoting angle, about which the first articulated shaft section is pivoted during the measurements)

Second Process Section: Measurements

Start of the measurement by using the control panel.

A drive wheel rolls on an arc-shaped driven path with either a positive or non-positive fit tensioned against this path and drives this driven path connected rigidly to the pivot arm.

The pivot arm is pivoted at least twice (according to the number setting) about the pivot axis=bending axis for overcoming breakaway and/or walking resistances (run-in bends), without the reaction forces detected by the device being evaluated.

The pivot arm is pivoted and the measurement results are recorded, for example, in an angle range of $35°<\alpha<+35°$.

The angle values are measured by an absolute shaft encoder.

The force measurement results are measured and recorded continuously.

Applying different, defined forces in directions or from direction, which do not correspond to the pivoting direction, is also conceivable.

Third Process Section: Evaluation

Evaluation of the results—the bending moments are calculated from force measurement values and the lever.

Presentation of the results advantageously on a display preferably as a profile of the bending moment over the bending angle from start to the reversing point and back again.

Evaluation alternatively with reference to the following features that can also be combined with each other arbitrarily in sequence and type:

minimum/maximum moment in certain adjustable angle ranges average values of the bending moments in both directions.

In measurement technology and in mechanical engineering, prism receptacles are understood to be receptacles, which have a V-shaped cutout for contacting, in particular, objects that are cylindrical on the exterior. These objects each contact a leg of the V in the V-shaped receptacle, so that the longitudinal axis runs between the legs (two-point contact in the prism). In such receptacles, the objects the objects such as shafts, are stabilized by their own weight and can be centered with reference to their longitudinal axis/rotational axis and without rocking. The distances of the prism receptacles to each other are adjustable in the direction of the longitudinal axis of the articulated shaft section, in order to adjust the measurement arrangement to different sizes of articulated shaft sections.

The articulated shaft section clamped rigidly in the measurement arrangement is designated in this document as the second articulated shaft section for the purpose of distinguishing it.

Walking resistances are the resistances caused by grease in roller bearings, for example, in the universal joint bushings. This is because the grease has not yet been distributed adequately in previously unused roller bearings and obstructs the rolling movements of roller bodies. The same effect occurs when the grease has too solid a consistency due to low outside temperatures. These walking resistances are overcome by at least two pivoting and distributing or soft walking processes. This pivoting is designated as run-in bends before the beginning of the measurements.

The invention further provides a measurement arrangement, with which the claimed method can be performed. The measurement arrangement has at least one pivoting arm, which can pivot about the pivot axis, the device (force measurement sensor) sitting on the pivoting arm, and the pivoting drive for the pivoting arm and tensioning devices for the rigidly clamped articulated shaft section. The entire measurement arrangement is preferably arranged on a massive frame that can be leveled. A control box and also the evaluation electronics can also be integrated into the frame. On the frame, all of the components of the measurement device are preferably mounted on one base plate. Articulated shafts with one or with several joints can be tested using the measurement device.

In this case, leveling is understood to be the exact alignment of all of the height differences of the flat base plate on a horizontal plane. For this purpose, the frame is provided at several positions preferably with encased bubble levels. In measurement technology, a bubble level is a hollow glass or plastic body filled with a fluid and a gas bubble for testing the horizontal or vertical position of an object.

Other constructions of the invention, as well as embodiments of this invention, are described below.

BRIEF DESCRIPTION OF THE DRAWINGS

The invention is explained in more detail below with reference to embodiments. Shown are:

FIG. 9 is a schematic diagram for the arrangement, the parameters, and the execution of the measurement in a side view, FIG. 10 is the schematic diagram of the arrangement from FIG. 6 in a top view.

DETAILED DESCRIPTION OF THE PREFERRED EMBODIMENT

Figure 1:
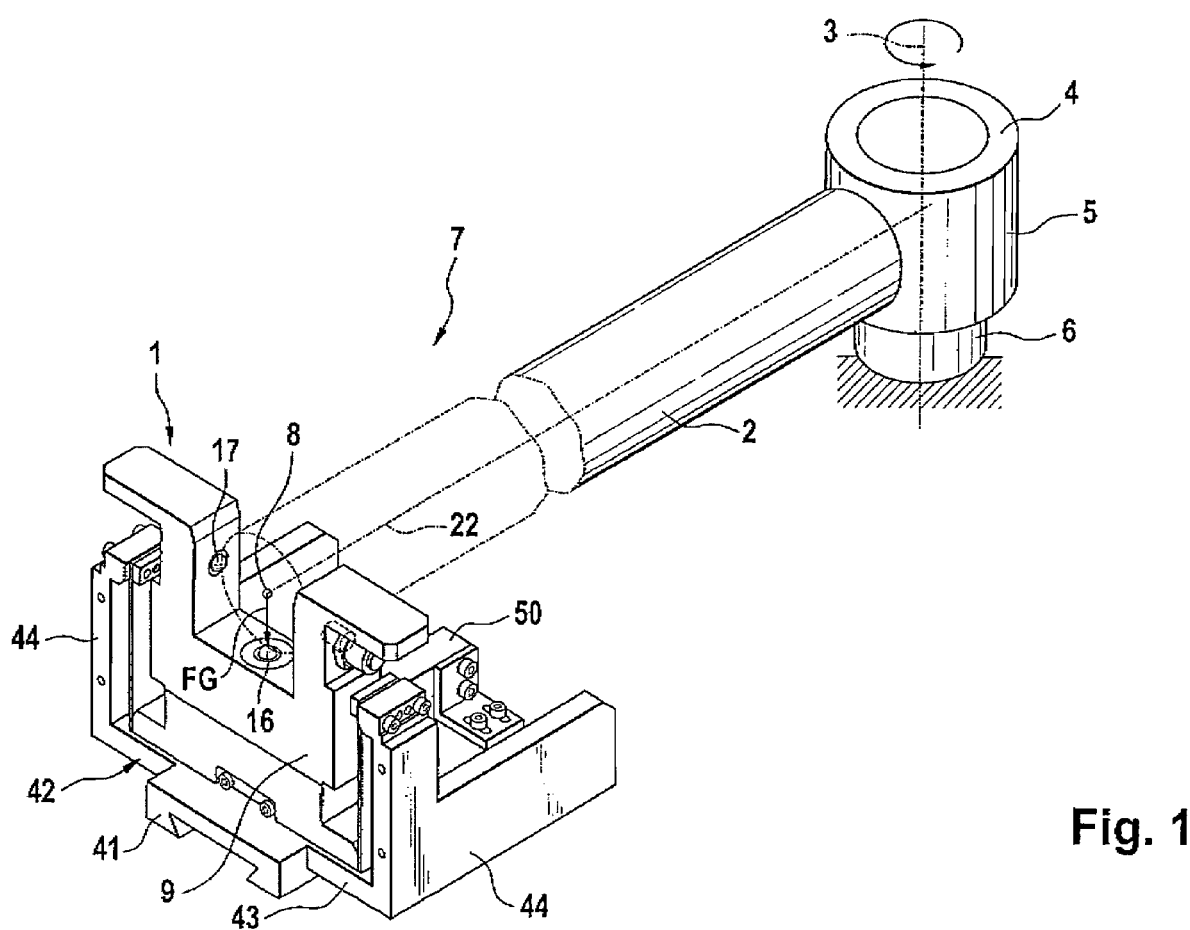
FIG. 1 is a view of a measurement arrangement with a device for measuring reaction moments and forces on a lever pivoting or rotating about a rotational axis.

In FIG. 1, a device 1 for measuring reaction moments and forces on a lever 2 is shown in a measurement arrangement 7. A receptacle 9 holds the lever 2. The device 1 with the lever 2 can at least pivot about a rotational axis 3 or can rotate about the rotational axis 3 on a circular path. The rotational axis 3 is oriented in this example for rotation horizontally, but can also be oriented vertically or in some other direction. The device 1 is spaced apart from the rotational axis 3 in the radial direction and can pivot/rotate with the lever 2 about the rotational axis 3.

The lever 2 is connected rigidly to a rotating connection 4. This rotating connection 4 can be, for example, a sliding or rolling bearing. The lever 2 is then connected, for example, to the outer ring 5 of the bearing. The weight of the lever 2 is typically supported on the pin 6, which is a component of the device 1 and is stationary on this device and on which sits the rotating connection 4 or a bearing. Because the force of gravity FG contacts the lever at a distance to the pin center (relative to the rotational axis 3), transverse forces are produced in the rotating connection 4. Such transverse forces generate additional moments, which are superimposed on the original moments of the rotating connection 4 and are thus undesired, in the rotating connection. Therefore, the lever 2 is preferably held at its center of gravity 8 in the receptacle 9, so that the rotating connection 4 is free from the influences of the force of gravity FG.

Figure 2:
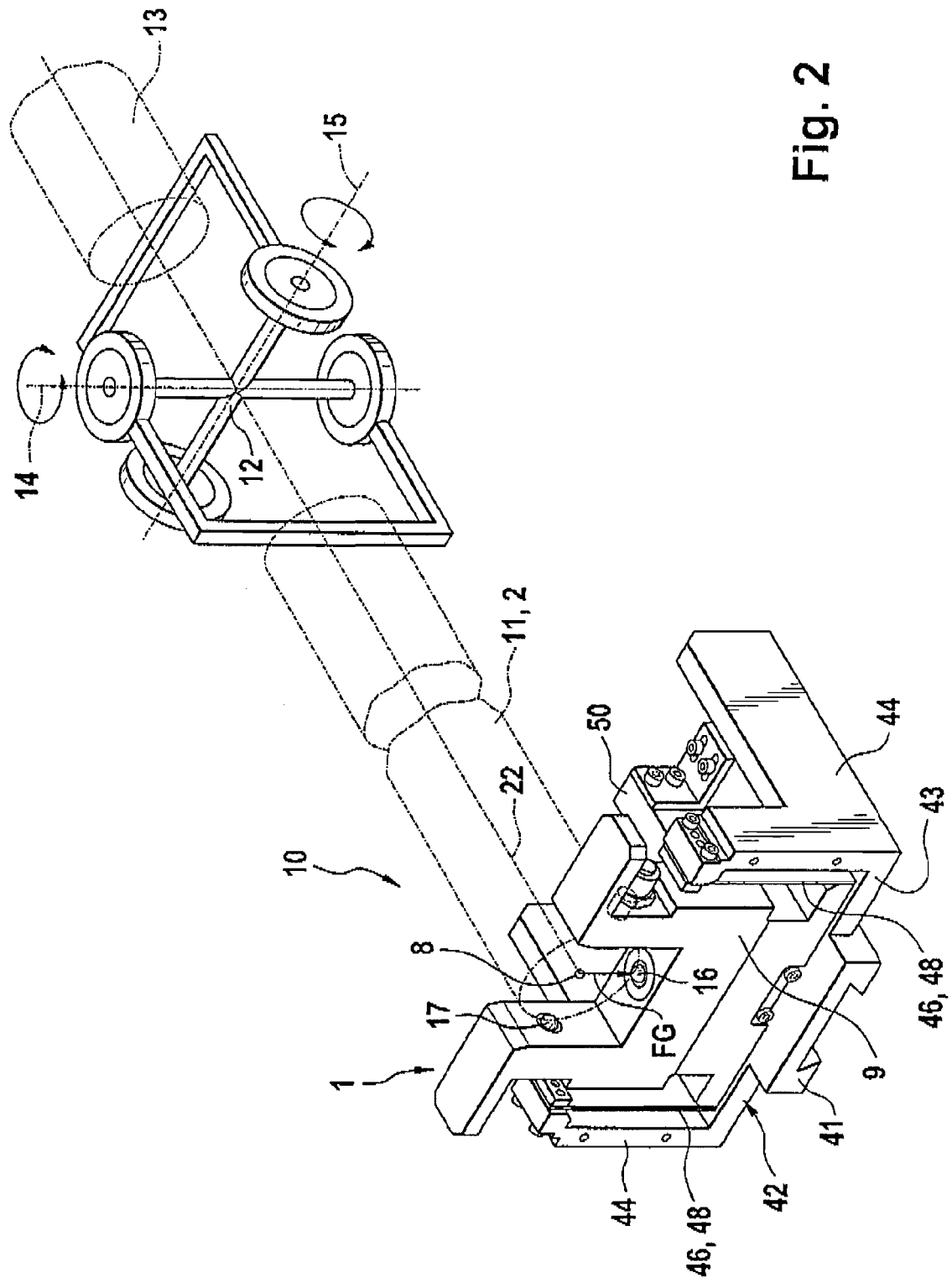
FIG. 2 is a view of the device from FIG. 1 in a measurement arrangement, in which the bending moments of an articulated shaft arrangement are measured or compared.

FIG. 2 shows the device 1 in a measurement arrangement 10 for measuring bending moments of a joint 12 in the form of a pin universal joint, which connects the two pivoting articulated shaft sections 11 and 13 in an articulated way. The lever 2 is the first articulated shaft section 11, which is connected in an articulated manner via a joint 12 to a second articulated shaft section 13. In FIGS. 9 and 10, the arrangement is shown schematically.

The articulated shaft provided in the representations of FIG. 9 and FIG. 10 with the reference symbol 56 can be formed alternatively from only the two articulated shaft sections 11 and 13, but can also have another articulated shaft section 57.

Method:

The second articulated shaft section 13 of the articulated shaft 56 to be tested, with this articulated shaft section being clamped rigidly at a later time for the measurement, is placed in the measurement device 10 in prism receptacles 58 (see also FIG. 6).

Figure 8:
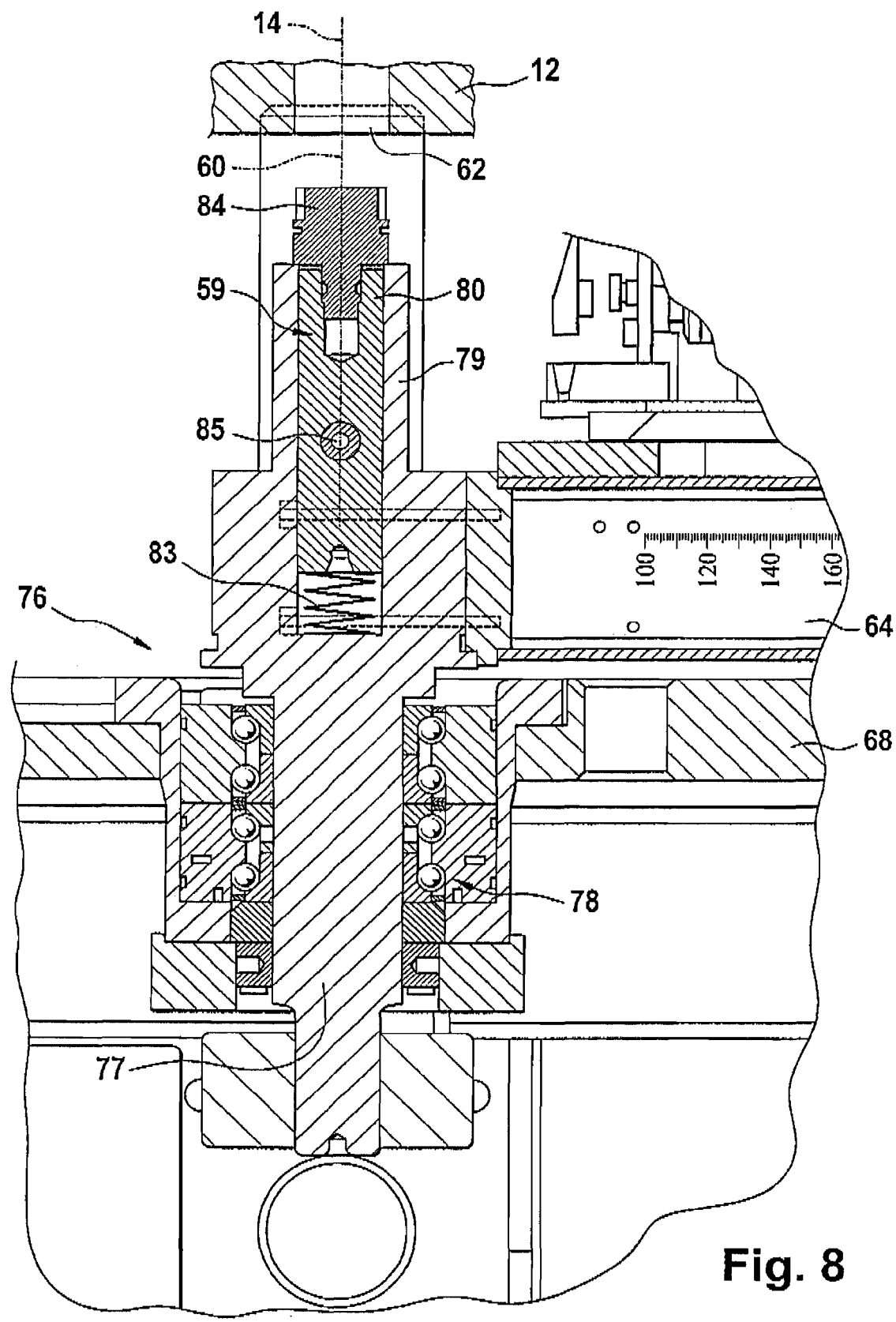
FIG. 8 is the detail Z from FIG. 7 shown enlarged.

The center of the joint 12 (bending axis 14) is then oriented in a next step initially roughly relative to a centering peg 59 (FIG. 8). In articulated shaft arrangements with universal joints, the joint 12 is oriented so that initially a bending axis 14 is oriented in the same direction as the center axis of the centering peg 59. At a later time, for preparing the measurement about the other bending axis 15, the joint is then turned by 90°, so that the other bending axis 15 is oriented in the same direction as the center axis 60 of the centering peg 59.

In a next step the first articulated shaft section 11 is placed/latched into a receptacle 9 of the actual device 1, pre-tensioned preferably without play and described below in more detail for measuring the reactions from the bending moments. The first articulated shaft section 11 is clamped in this receptacle 9 preferably without play in the radial directions, but can be shifted along its longitudinal axis 22/rotational axis.

The first articulated shaft section 11 is initially oriented coarsely along its longitudinal axis, so that the center of gravity 8 of the first articulated shaft section 11 is supported in the device 1 at a distance A to the pivot axis 60, to which the forces of the pivoting drive 61 are also later introduced into the device. As emerges from FIG. 8, the center axis 60 of the centering peg 59 corresponds to the pivoting axis 60.

Then the centering peg 59 is extended and inserted, for example, into an eye of the joint yoke of the joint 12 or in another centering opening 62, whose central axis is the bending axis 14, so that the pivoting axis 60 of the measurement arrangement and the bending axis 14 of the joint 12 are concentric to each other after the centering (FIG. 8).

The second articulated shaft section 13 is clamped rigidly.

The centering peg 59 is moved out from the centering opening 62 and reinserted.

The distance A is input as a parameter into the software.

Figure 7:
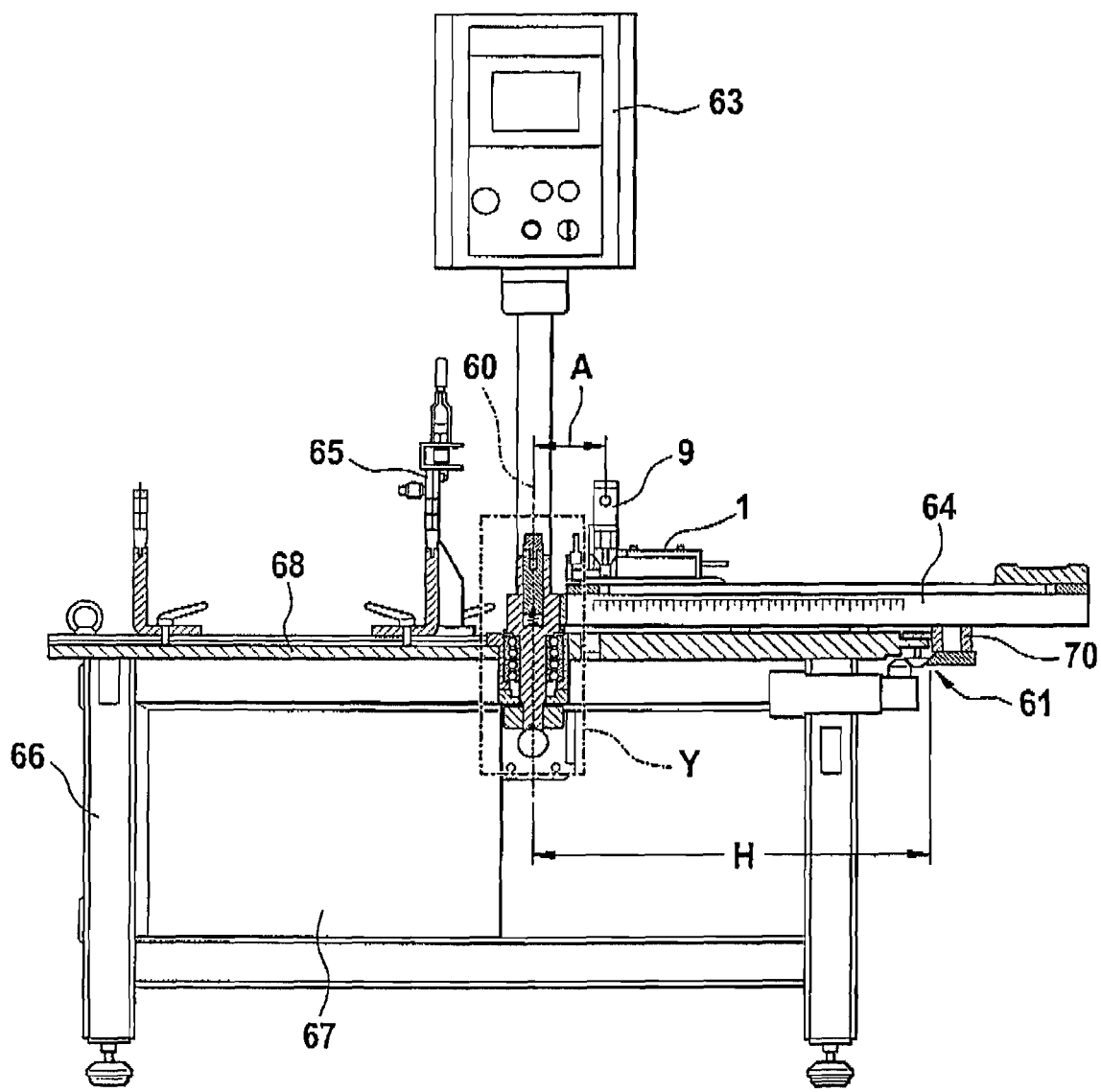
FIG. 7 is a longitudinal section view of the measurement arrangement from FIG. 6 taken along the line VII-VII in FIG. 6.

Start of the measurement using the control panel—display (FIG. 7).

Starting of the pivoting drive 61.

The pivot arm 64 is pivoted at least twice about the pivot axis=bending axis 14 for overcoming breakaway and/or walking resistances (run-in bends), without the reaction forces detected by the device 9 being evaluated.

The pivot arm 64 is pivoted and the measurement results are recorded, for example, in an angle range of $+/-\alpha$.

The angle values are measured by an absolute shaft encoder.

The force measurement results are measured and recorded continuously.

Applying different, defined forces in directions or from direction, which do not correspond to the pivoting direction Y, is also conceivable.

Evaluation of the results—the bending moments are calculated from force measurement values and the distance A.

Presentation of the results advantageously on a display 63 preferably as a profile of the bending moment over the bending angle $\alpha$ from start to the reversing point and back again.

In the representation from FIG. 2, the device 1 with the articulated shaft section is pivoted about the vertically oriented bending axis 14. It is also conceivable that measurements are performed about the bending axis 15 oriented horizontally in the representation. It is typical that measurements are first executed about the bending axis 14 already oriented vertically in the figure, then the articulated shaft arrangement with the joint 12 is turned, so that the previously horizontally oriented bending axis 14 becomes vertically oriented, and then the articulated shaft section is bent about the bending axis 15 for further measurements. The device 1 prevents that the joint 12 does not buckle about the horizontal axis 15 for measurements of the torque about the vertically oriented axis 14.

The force of gravity FG of the lever 2 or the first articulated shaft section 11 is supported in the device 1 according to the invention on a first ball 16. At the side, the lever 2 or the first articulated shaft section 11 is guided and clamped between two opposing second balls 17 and 18 (see also FIG. 3). The second balls 17 and 18 transmit the forces, which result from the torques to be measured in the measurement arrangement 10, to the pivoting device 1.

Figure 5:
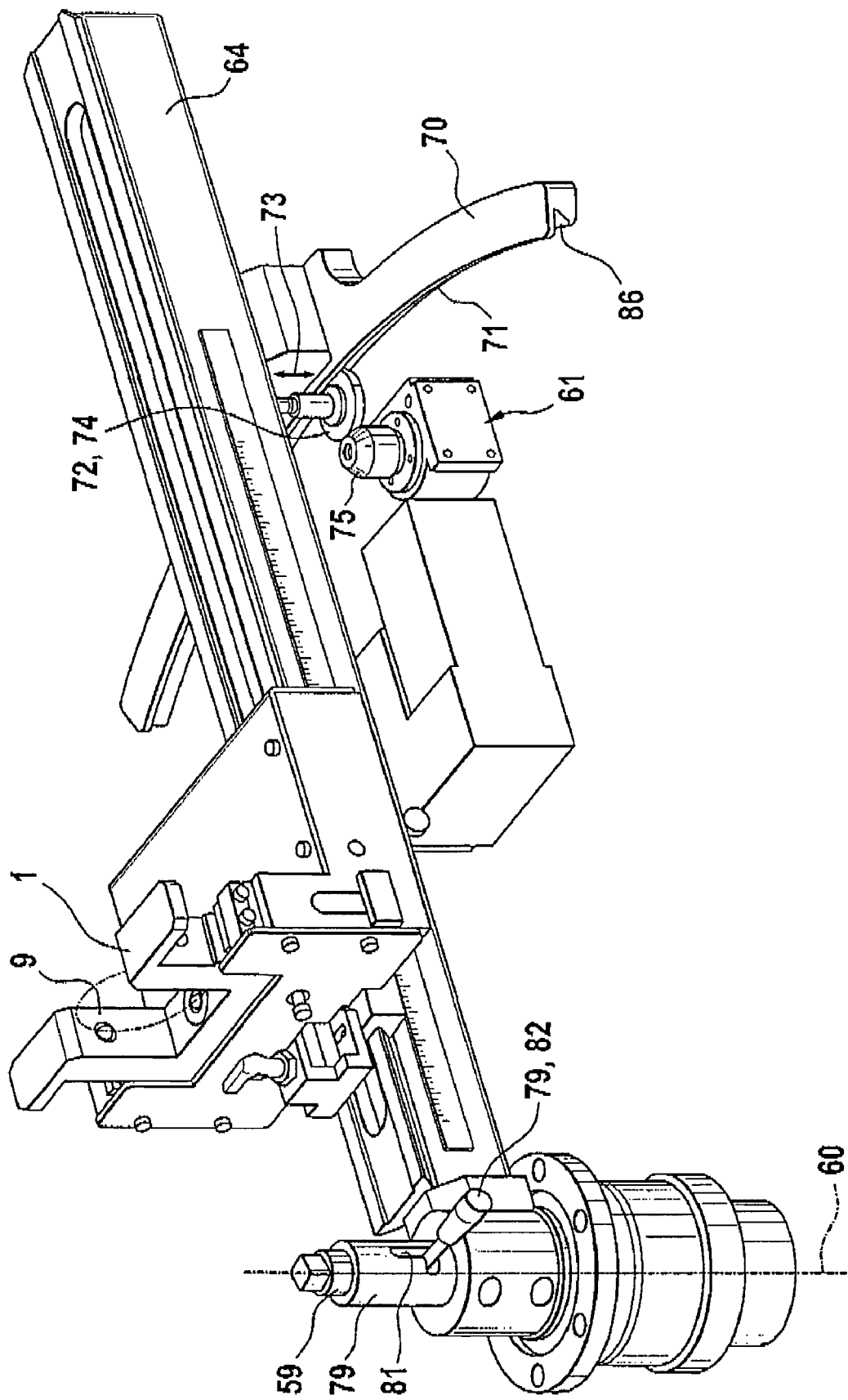
FIG. 5 is an overall view of the measurement arrangement without a base plate and without a frame.
Figure 6:
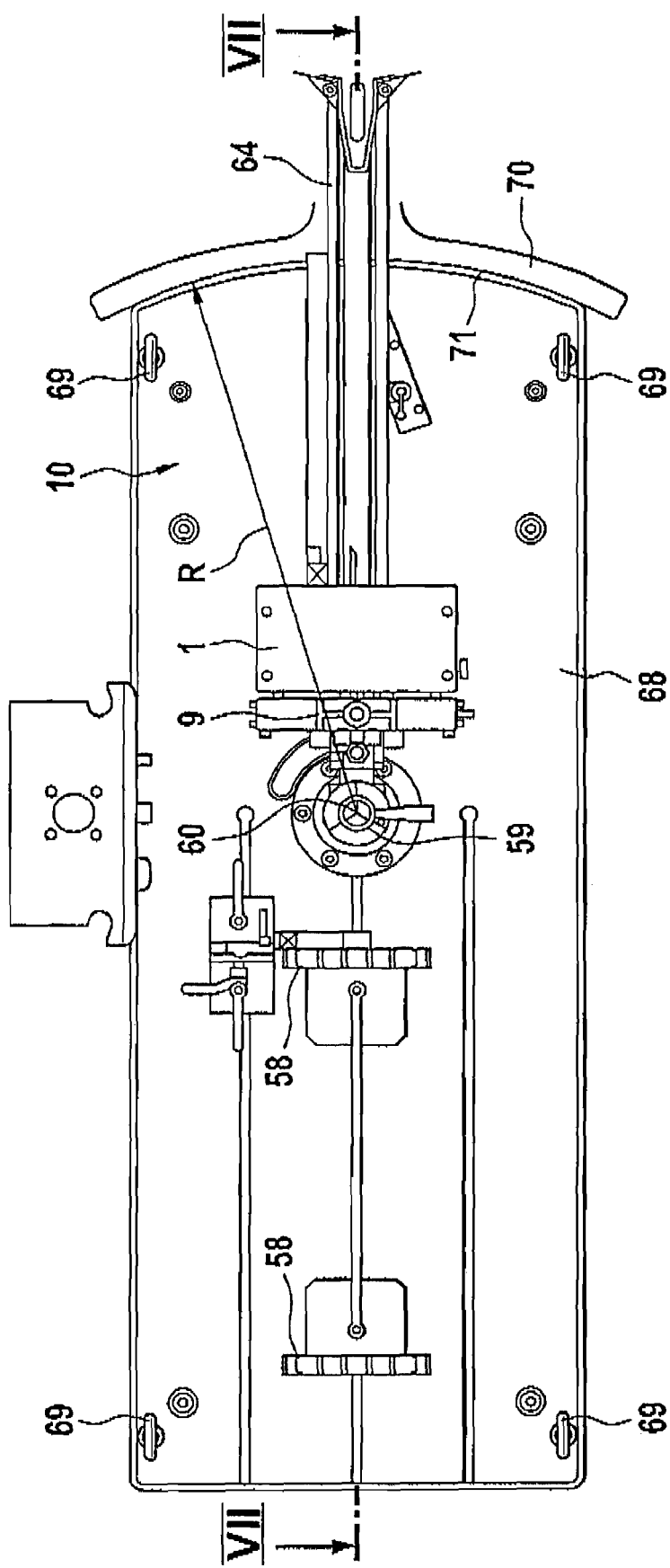
FIG. 6 is a top view of the measurement arrangement with a frame.

FIGS. 5 to 7 show a measurement arrangement 10, with which the claimed method can be performed. The measurement arrangement 10 has at least one pivoting arm 64, which can pivot about the pivot axis 60, the device 1 (force measurement sensor) sitting on the pivoting arm, the pivoting drive 61 for the pivoting arm and tensioning devices 65 for the rigidly clamped articulated shaft section. The entire measurement arrangement 10 is preferably arranged on a massive frame 66 that can be leveled. A control box 67 and also the evaluation electronics can also be integrated into the frame 66. On the frame 66, all of the components of the measurement device 10 are preferably mounted on one base plate 68. Articulated shafts 56 with one or with several joints 12 can be tested using the measurement device 10. The frame 66 is preferably provided at several positions advantageously with encased bubble levels 69 for testing the horizontal position of the base plate 68.

The smallest distance to the pivot axis 60, with which the pivoting drive 61 contacts the pivoting arm 64, is greater than the greatest distance A, with which the center of gravity 8 of the articulated shaft section 11 is removed from the bending axis/pivot axis 60. And thus, the smallest distance H to the pivot axis 60, with which the pivoting drive 61 contacts the pivot arm 64, is greater than the greatest distance, with which the device 1 sits on the pivoting arm 64 at a distance to the pivot axis 60. The necessary drive forces of the pivoting drive 61 are small. The measurement results are more precise, because, if the pivoting drive 61 were to lie closer to the pivot axis 60 than the receptacle 9, then, for one, the pivoting drive 61 would have to apply higher drive forces and thus would have to be more powerful and, two, the inertia of the masses of the device 1 and the articulated shaft section 11 would negatively affect the measurement results—because in this case the center of gravity of the articulated shaft section and the pivot lever would be farther away from the pivot axis 60 than the drive.

FIG. 5 and FIG. 8—The centering peg 59 has a construction with at least two parts and is a component of the pivoting device 76. The center axis of the pivoting device 76 is the pivot axis 60. The pivoting device 76 is further formed from the actuator 85 for the centering peg 59, from a pivoting pin 77, and from a bearing 78. The pivoting pin 77 is connected rigidly to the pivoting arm 64 and is held so that it can rotate in the base plate 68 about the pivot axis 60 via the bearing 78. On the end, the pivoting pin 77 has a guide 79, in which a shaft 80 of the centering pin 59 sits. The guide 79 is provided with a connecting link track 81. An actuating lever 82 for the centering peg 59 projects from the connecting link track 81. The actuating lever 82 is connected to the shaft 80. The shaft 80 is pretensioned by a spring 83 and held back by the actuating lever 82 and the connecting link track 81 in the guide 79. As another component of the centering peg 59, on the shaft 80 there is an adapter 84, which is adapted to the inner contours of the centering opening 62 on the joint 12 and can be exchanged quickly. For lifting the centering peg 59, the actuating lever 82 first pivots in the horizontal plane about the pivot axis 60 and is then moved by the spring tension in the connecting link track 81 vertically upward into the centering opening 62. When the centering peg 59 is lowered, the actuating lever 82 is moved downward against the force of the spring 83 vertically in the connecting link track 81 and secured in the lowered position shown in FIG. 8 by pivoting in the horizontal plane about the pivot axis 60.

Figure 3:
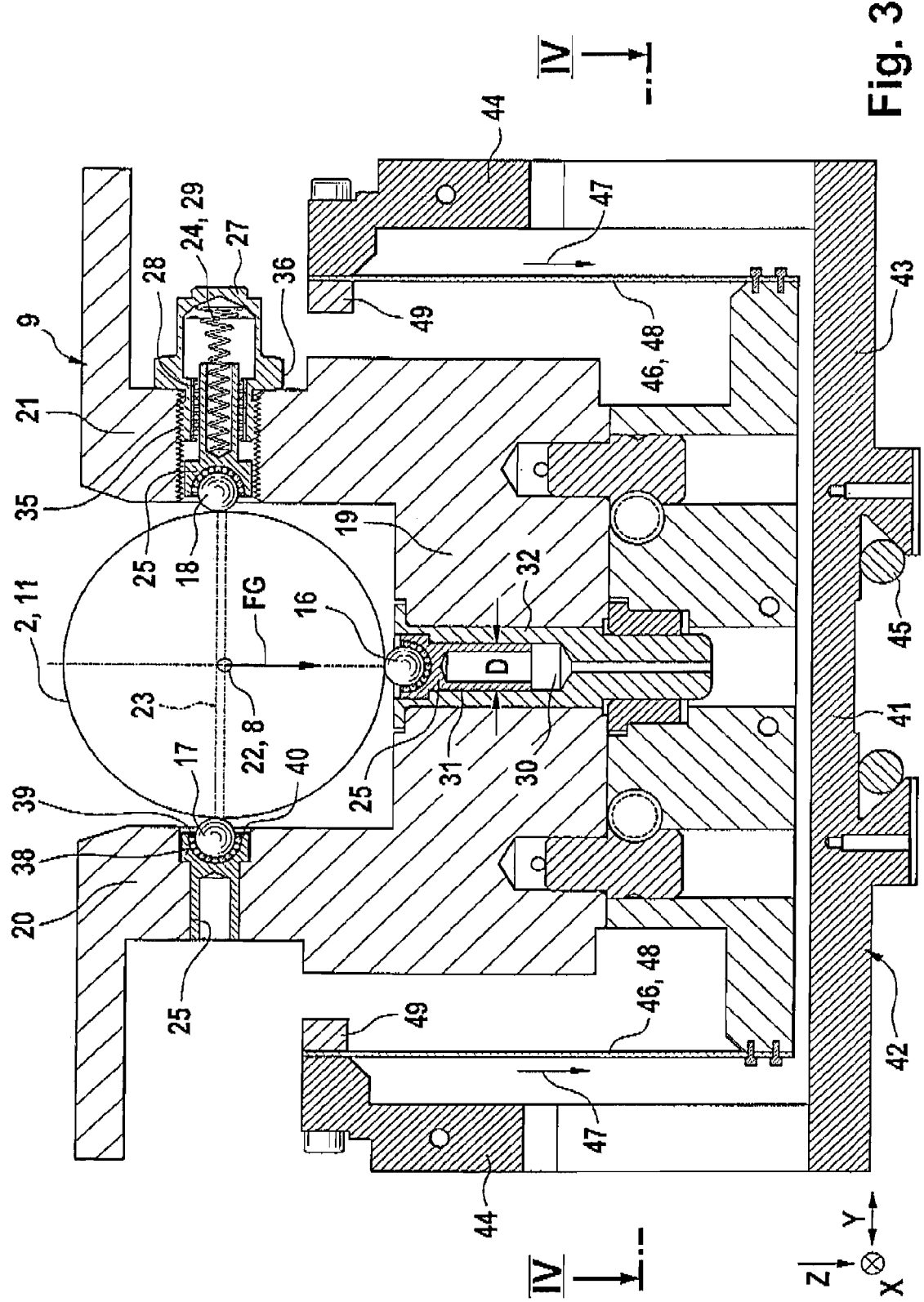
FIG. 3 is a longitudinal section view through the device from FIGS. 1 and 2.
Figure 4:
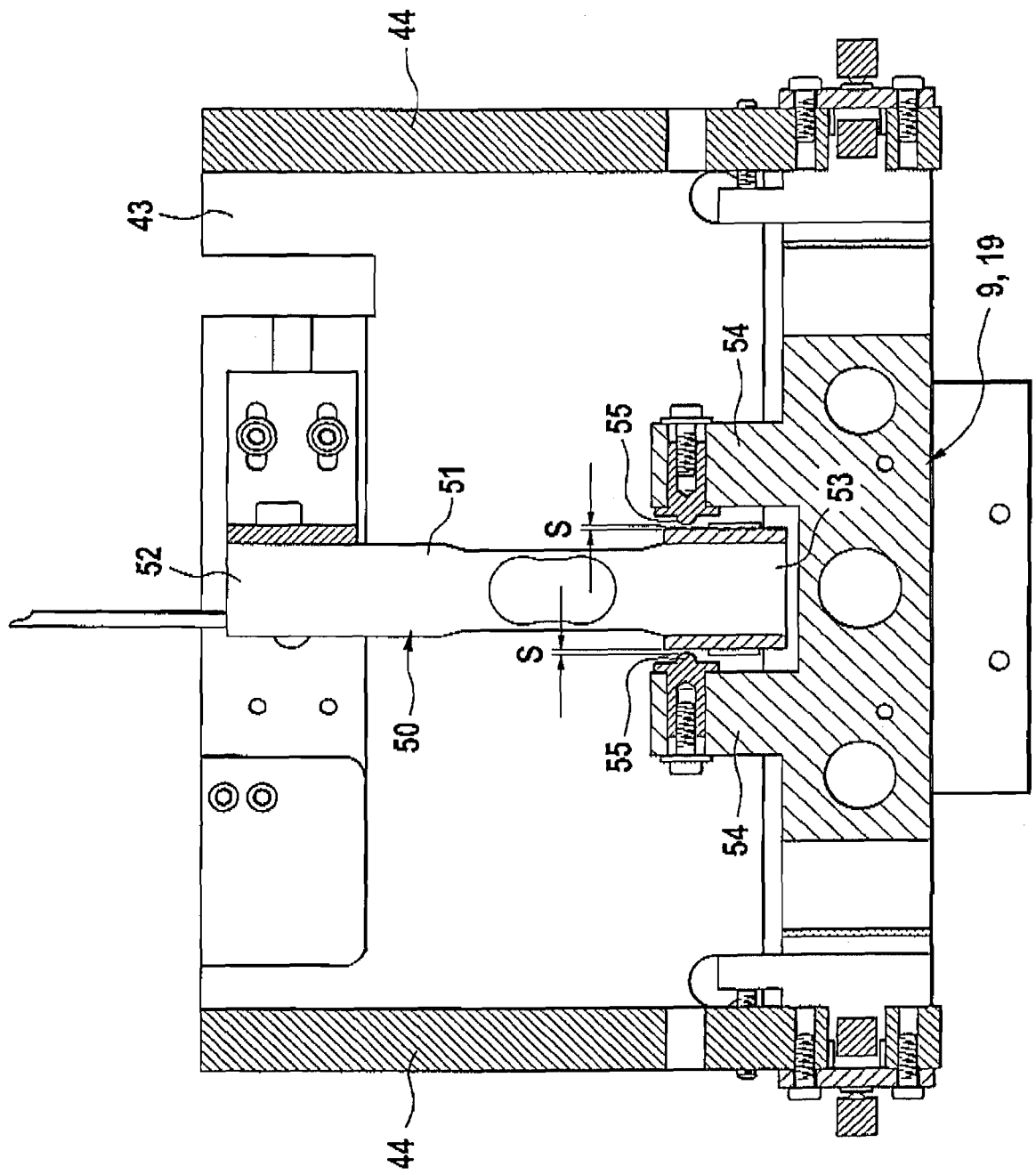
FIG. 4 is a top view onto the force measurement sensors with reference to a sectional representation of the device cut along the line IV-IV from FIG. 3.

FIG. 3—The receptacle 9 is constructed with a U shape with a base 19 and two legs 20 and 21 projecting vertically from this base. The articulated shaft section 11 is held without constraint between the legs 20 and 21. For this purpose, balls, which can rotate relative to the device 1 in an arbitrary directional sense about their own center, are supported on the legs 20 and 21 and on the base 19. The first articulated shaft section 11 is supported on the force of gravity side at its center of gravity 8 on the first ball 16.

So that the ball 16 is mounted rotatably, the articulated shaft section 11 is mounted so that it can move longitudinally on the first ball 16 along its longitudinal axis 22 in the device 1. The longitudinal axis 22 of the articulated shaft section 11 is the axis, which intersects the bending axis 14 in the ideal position and which is the rotational axis of the articulated shaft section 11 in the articulated shaft arrangement installed in the vehicle.

The two second balls 17 and 18 are arranged at a distance to each other on the peripheral sides relative to the first ball 16 about the longitudinal axis 22 of the articulated shaft section and provide for the lateral guidance of the articulated shaft section 11. The articulated shaft section 11 in this case concerns a total of three balls 16, 17, and 18 without being in contact with the receptacle 9. Because all of the balls 16, 17, and 18 are supported so that they can rotate, the articulated shaft section 11 is oriented in the device 1 nearly free from friction and is free from constraining forces.

The second balls 17 and 18 lie opposite each other so that an imaginary straight line 23 connecting their centers intersects the longitudinal axis 22. If this is not the case, and, for example, as shown in FIG. 3, there is an offset S between the longitudinal axis 22 and the straight line, this can be corrected either by raising or lowering the ball 16. Alternatively, this offset S can be intentionally generated or used in order to clamp the articulated shaft section 11 in the receptacle 9 in a better centered arrangement between the three balls 16, 17, and 18.

One of the second balls 17 is supported in a spring elastic way on the receptacle 9. It is also conceivable that both of the second balls 17 and 18 are supported in a spring elastic manner and/or the first ball 16 is supported on the receptacle 9.

Each ball 17 supported in a spring elastic manner on the device can be tensioned or not in a spring elastic manner against the articulated shaft section 11. If the ball(s) 11 is (are) not tensioned with the spring element 24 against the articulated shaft section 11, then each spring element 24 is a damping element, which damps vibrations of the measurement arrangement. If the ball(s) 17 is (are) tensioned against the universal shaft section 11, the universal shaft section 11 is clamped without play between the balls 17 and 18. The articulated shaft section 11 is "snapped in" between the balls when placed in the receptacle 9 or the articulated shaft section 11 is clamped by adding the ball(s) 17, 18 after placement.

The lever 2 or the first articulated shaft section 11 is clamped in the longitudinal direction so that it can move freely between the balls 17 and 18 and is supported on these balls like roller bearings. Deviations of the shape and position, which could lead to twisting of the lever 2 or the first articulated shaft section 11 in the device 1 or the measurement arrangement 7 or 10, are compensated in a spring elastic way, so that each arrangement is free from constraining forces.

The balls 16, 17, 18 are each held preferably on a respective bolt 25 and can rotate on this bolt. The bolt 25 preassembled with the respective ball 16 or 18 is either pressed directly into a corresponding hole or the bolt 25 is first preassembled into a unit composed of the housing 27, bolt 25, a linear bearing 28 for supporting the bolt 25, a ball 17, and a helical spring 29, which can be screwed into the receptacle 9. For this purpose, the unit has an external thread 35 and a hexagon 36 on the housing 27. The external thread 35 fits into an internal thread of the device. For the purpose of retrofitting, various of these units can be exchanged one for the other, which do have the same dimensions in terms of the thread of the screw-in sleeve, but can differ from each other selectively in the dimensions of the bolt, spring, and balls.

A bolt 25, on which the first ball 16 is supported, sits in a guide bushing 32. The bolt 25 is pressed with the shaft 31 rigidly into the guide bushing 32 and the guide bushing on its side sits rigidly in the base 19. Alternatively, the bolt 25 can be charged on the rear side with compressed medium via a pressure space 30 and therefore can be lifted in the direction of the longitudinal axis 22 or lowered away from this longitudinal axis in the guide bushing 32 for calibration processes through the use of compressed medium such as oil or air.

The mounting of the balls 16, 17, and 18 on the respective bolts 25 has various advantages. The balls 16, 17, and 18 can be more easily displaced in the direction of the longitudinal axis 22 or away from this axis by the change in position or length of the bolt 25. This is advantageous when retrofitting the device, for example, for shafts or articulated shafts with different diameters. In addition, the devices can be easily retrofitted for different dimensions of a wide range of articulated shafts if the bolts are exchangeable. For this purpose, the dimensions of the holes or guidance of the bolt 25 and the housing 27 are standardized so that the bolts 25 are different from each other, for example, in the selection of the balls, for example, all of them have a common diameter D on the shaft 31.

A dome-shaped receptacle 38, which is filled with ball bearings 39, is formed on each of the bolts 16, 17, and 18. The diameter of the ball bearings 39 is smaller by a multiple than the diameter of the first ball 16 or the second balls 17 and 18. The first ball 16 receives the weight of the lever 2 or the articulated shaft section 11 and is supported on the ball bearings 39 and the ball bearings 39 are supported in the receptacle 38 on the bolt 25. The second ball 17, 18 forwards the guide forces to the ball bearings 39, which are supported on their sides on the bolts 25. Alternatively, the bolts 25 are tensioned with balls 17, 18 in a spring-like manner against the lever 2 or against the articulated shaft section 11. The balls 16, 17, 18 are each held by a narrowed edge 40 of the receptacle 38 on the bolt 25.

FIGS. 1-3—The device 1 for measuring reaction moments and forces on a lever 2 or for measuring bending moments of a joint 12 has a carrier 42. The carrier 42 is formed from a base plate 43 and two traverses 44. The traverses 44 project at a right angle from the base plate 43. The receptacle 9 can be deflected relative to the carrier 42 in opposite measurement directions fixed to the traverses 44. The carrier 42 is arranged fixed in place relative to the receptacle 9 on the device 1 on a sled 41. The sled 41 can be shifted on a rail 45. The rail 45 is formed on the pivoting arm 64. By shifting the sled 41, the distance between the rotational axis 3, 14, and 15 and the receptacle 9 can be adapted to different lengths of levers or articulated shaft sections 11.

FIGS. 5, 7-8—A driven rail 70 of the pivoting drive 61 is fixed to the pivoting arm 64. The driven rail 70 has a curved driven track 71. The driven track 71 is curved about the pivot axis 60 and described at least by a radius R originating from the pivot axis 60. The driven track 71 is in geared connection with a driving element 72 of the pivoting drive 61.

The driven rail 70 has at least one friction surface 86 on the driven track 71, wherein the friction surface 86 is described at least by the radius R originating from the pivot axis. The drive element 72 has a friction wheel 74 that can be tensioned and frictionally engaged against the friction surface and that can be motor driven. The friction wheel 74 has at least one rubber coating or similar material with high coefficient of friction, which corresponds to the frictionally engaged friction surface. The geared connection can be separated and reconnected by lifting the friction wheel 74 from the friction surface, for example, in the direction of the arrow 73. With such a separable arrangement, it can be avoided that pressure points are formed either on the friction wheel 74 or on the friction surfaces when the device is at a standstill. These pressure points have a disadvantageous, falsifying effect on the measurement results. The geared connection is further formed by a motor-driven friction wheel 75, which drives the friction wheel 74.

FIGS. 1-3—The receptacle 9 is suspended by the pendulum arms 46 on the carrier 41 and can oscillate freely at least in the measurement directions designated with the double arrow relative to the carrier 41. In FIG. 3, the receptacle 9 is shown in the rest position, from which the receptacle can pivot to the left or right. The pendulum arms 46 are tensioned in the rest position by the weight of the receptacle 9 and by the weight of the lever 2 or articulated shaft section 11 in the Z-direction of the arrows 47 and are rigid and not elastic in the Z-direction. The pendulum arms 46 are leaf springs 48, which are elastically flexible in the Y-direction and have an essentially higher moment of resistance against bending in the X-direction than in the Y-direction.

Each of the leaf springs 48 is clamped rigidly to one of the traverses 44 by a clamp 49. The leaf springs 48 are oriented parallel to each other in the device 1 and the rest position of the receptacle 9.

The device 1 is provided with at least one sensor 50, which is supported fixed in place on the base plate 43, for measuring the deflections of the receptacle 9 shown relative to the base plate 43 of the carrier 42. The sensor 50 is a bending beam 51 with an expanding measurement strip not shown in more detail. The bending beam 51 is fixed in place relative to the device at one end 52 on the base plate 43. The other end 53 of the bending beam 51 lies opposite the receptacle 9 in the rest position in the measurement directions without contact by the play A. For this purpose, the receptacle 9 has two stops 54, which project in the longitudinal direction from the receptacle 9 at a distance from each other and lie opposite each other at a distance in the measurement direction. Tips of the balls 55 are fixed to the stops 54, with these tips being directed relative to each other in the measurement directions. The end 53 of the bending beam 51 engages at the distance with play S to the ball tips 55.

REFERENCE SYMBOLS

| | |
|---|---|
| 1 | Device |
| 2 | Lever |
| 3 | Rotational axis |
| 4 | Rotating connection |
| 5 | Outer ring |
| 6 | Pin |
| 7 | Measurement arrangement with rotating connection |
| 8 | Center of gravity |
| 9 | Receptacle |
| 10 | Measurement arrangement with articulated shaft |

-continued

| | |
|---|---|
| 11 | First articulated shaft section |
| 12 | Joint |
| 13 | Second articulated shaft section |
| 14 | Bending axis |
| 15 | Bending axis |
| 16 | First ball |
| 17 | Second ball |
| 18 | Second ball |
| 19 | Base of the receptacle |
| 20 | Leg of the receptacle |
| 21 | Leg of the receptacle |
| 22 | Longitudinal axis |
| 23 | Straight line |
| 24 | Spring element |
| 25 | Bolt |
| 26 | not assigned |
| 27 | Housing |
| 28 | Linear bearing |
| 29 | Helical spring |
| 30 | Pressure space |
| 31 | not assigned |
| 32 | not assigned |
| 33 | not assigned |
| 34 | not assigned |
| 35 | not assigned |
| 36 | not assigned |
| 37 | not assigned |
| 38 | not assigned |
| 39 | not assigned |
| 40 | not assigned |
| 41 | Sled |
| 42 | Carrier |
| 43 | Base plate |
| 44 | Traverses |
| 45 | Rail |
| 46 | Pendulum arms |
| 47 | Arrow in the longitudinal direction |
| 48 | Leaf spring |
| 49 | Clamp |
| 50 | Sensor |
| 51 | Bending beam |
| 52 | End of the bending beam |
| 53 | End of the bending beam |
| 54 | Stop |
| 55 | Ball tip |
| 56 | Articulated shaft |
| 57 | Articulated shaft section |
| 58 | Prism receptacle |
| 59 | Centering peg |
| 60 | Center axis/pivot axis |
| 61 | Pivoting drive |
| 62 | Centering opening |
| 63 | Control panel display |
| 64 | Pivoting arm |
| 65 | Tensioning device |
| 66 | Frame |
| 67 | Control box |
| 68 | Base plate |
| 69 | Bubble level |
| 70 | Driven rail |
| 71 | Driven track |
| 72 | Driven element |
| 73 | Arrow |
| 74 | Friction wheel |
| 75 | Friction wheel |
| 76 | Pivoting device |
| 77 | Pivoting pin |
| 78 | Bearing |
| 79 | Guide |
| 80 | Shaft |
| 81 | Connecting link track |
| 82 | Actuating lever |
| 83 | Spring |
| 84 | Adapter |
| 85 | Actuator |
| 86 | Friction surface |

The invention claimed is:

1. Method for measuring bending moments on a joint, wherein the joint is formed from at least two joint sections, which are flexible relative to each other at least about a bending axis, the method comprising:
bending the joint, in that at least one first joint section is pivoted about a pivot axis relative to a second joint section,
determining bending moments, in that reactions forces on one of the joint sections are at least detected with a device, wherein the reaction forces on the joint section result from the bending moments when the joint is bent due to the pivoting of the joint section,
applying pivoting drive forces for pivoting about the bending axis at least to the first joint section by the device.

2. Method according to claim 1, further comprising supporting a weight of the first joint section at a center of gravity thereof in the device.

3. Method according to claim 1, further comprising transmitting the pivoting drive forces by the device with a distance to the bending axis to the first joint section, with which the center of gravity of the first joint section is also spaced apart from the bending axis.

4. Method according to claim 1, wherein before the pivoting of the first joint section about the pivot axis, orienting the bending axis and the pivot axis coaxial to each other.

5. Method according to claim 1, wherein the joint is of an articulated shaft, which is formed from at least one first articulated joint section and from at least one second articulated joint section, wherein the articulated joint sections are connected to each other in an articulated manner by the joint, the method including at least the following steps:
inserting the first articulated shaft section into the device so that the weight of the first articulated shaft section applied at the center of gravity of the first articulated shaft section is supported in the device,
coaxially aligning the bending axis and the pivot axis to each other
applying the pivoting drive forces to the first articulated shaft section using the device with a distance to the bending axis, with which the center of gravity is also spaced apart from the bending axis,
detecting the reaction forces in the device through measurements, and
converting the measurement values into corresponding bending moments.

6. Method according to claim 5, further comprising pivoting the first articulated shaft section at least twice about the bending axis before the detection of the reaction forces with the device.

7. Method according to claim 5, wherein the second articulated shaft section is clamped rigidly.

8. Measurement arrangement for measuring bending moments on a joint comprising:
a pivoting arm, wherein the pivoting arm can pivot at least about a pivot axis,
a pivoting drive, which contacts the pivoting arm,
a device for measuring the reaction forces resulting from the bending moments of the joint on a first joint section, wherein the device sits on the pivoting arm so that it can pivot with the pivoting arm about the pivot axis, and
a tensioning device for stationary clamping of a second joint section, wherein the tensioning device is arranged fixed in place separate from the pivoting arm and the pivot axis.

9. Measurement arrangement according to claim 8, wherein a distance of the device to the pivot axis is adjustable in length.

10. Measurement arrangement according to claim 8, wherein a smallest distance to the pivot axis, with which the pivoting drive contacts the pivoting arm, is greater than a greatest distance, with which the center of gravity of the first joint section is removed from the pivot axis.

11. Measurement arrangement according to claim 8, wherein a smallest distance to the pivot axis, with which the pivoting drive contacts the pivoting arm, is greater than the greatest distance, with which the device sits on the pivoting arm at a distance to the pivot axis.

12. Measurement arrangement according to claim 10, wherein the distance of the device to the pivot axis is adjusted so that a weight of the first joint section applied at the center of gravity of the first joint section is supported in the device.

13. Measurement arrangement according to claim 8, further comprising a centering device, with which the bending axis is centered coaxial to the pivot axis, wherein the centering device comprises:
    at least one centering peg, which is insertable into a centering receptacle of the housing and can be lowered back out of the receptacle,
    the centering peg can be centered in the centering receptacle,
    the center axis of the centering peg is the pivot axis,
    the centering receptacle is oriented to the bending axis of the joint, so that the center axis of the centering peg centered in the centering receptacle is concentric to the bending axis.

14. Measurement arrangement according to claim 8, further comprising:
    on the pivot arm there is a device for measuring reaction forces on the bending moments on the joint,
    the device can pivot with the pivoting arm about a pivot axis,
    a driven rail of the pivoting drive is fixed to the pivoting arm,
    the driven rail has a curved driven track,
    the driven track is curved about the pivot axis and described by at least one radius originating from the pivot axis,
    the driven track is in geared connection with a driving element of the pivoting drive, and
    the driving element is motor driven.

15. Measurement arrangement according to claim 14, wherein the driven rail has at least one friction surface on the driven track, wherein the friction surface is described by at least one radius originating from the pivot axis and in which the driving element is at least one friction wheel that can be tensioned frictionally engaged against the friction surface and that can be motor driven.

16. Measurement arrangement according to claim 14, wherein the geared connection can be separated by lifting the friction wheel from the friction surface.

17. Measurement arrangement according to claim 15, wherein the friction wheel is charged by an additional motor-driven friction wheel.

* * * * *